United States Patent
Denton et al.

(10) Patent No.: US 8,566,307 B2
(45) Date of Patent: Oct. 22, 2013

(54) DATABASE QUERY GOVERNOR WITH TAILORED THRESHOLDS

(75) Inventors: James L. Denton, Rochester, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 12/770,866

(22) Filed: Apr. 30, 2010

(65) Prior Publication Data

US 2011/0270822 A1    Nov. 3, 2011

(51) Int. Cl.
    G06F 17/00    (2006.01)
(52) U.S. Cl.
    USPC ............ 707/719; 707/748; 707/751
(58) Field of Classification Search
    USPC .................. 707/719, 748, 769
    See application file for complete search history.

(56) References Cited

U.S. PATENT DOCUMENTS

| | | | |
|---|---|---|---|
| 7,340,448 B2 | | 3/2008 | Santosuosso |
| 8,122,010 B2 * | | 2/2012 | Barsness et al. ............. 707/718 |
| 2005/0108188 A1 | | 5/2005 | Santosuosso |
| 2005/0177557 A1 | | 8/2005 | Ziauddin et al. |
| 2008/0133447 A1 * | | 6/2008 | Barsness et al. ............. 707/1 |
| 2009/0171760 A1 * | | 7/2009 | Aarnio et al. ............... 705/10 |

* cited by examiner

Primary Examiner — Belix M Ortiz Ditren
(74) Attorney, Agent, or Firm — Martin & Associates, LLC; Bret J. Petersen

(57) ABSTRACT

A query governor intelligently sets tailored thresholds for a query accessing a computer database. The query governor preferably generates a tailored threshold for each query sent to the database for execution. The tailored threshold for the query is preferably compared to an estimated query execution time to determine whether to execute the query. The query governor uses one or more factors applied to a standard threshold to generate the tailored threshold. The factors preferably include user factors and query factors. These factors are dynamically adjusted by the query governor in an intelligent way to increase optimal use of the database. Other factors may include factors such as job priority factor, resource factor and an application factor.

21 Claims, 5 Drawing Sheets

User Factors Data File

| User Name | Score | User Type |
|---|---|---|
| John D. | 120 | Admin |
| Thomas A. | 85 | New User |

Query Factors Data File

| Query ID | Score |
|---|---|
| Q111 | 85 |
| Q222 | 110 |

DATABASE QUERY GOVERNOR WITH TAILORED THRESHOLDS

BACKGROUND

1. Technical Field

This disclosure generally relates to computer database systems, and more specifically relates to a query governor for a database system that intelligently sets tailored thresholds for governing a query accessing a computer database.

2. Background Art

A computer database is a collection of computer data stored within a computer system. To be useful, the data stored in databases must be able to be efficiently retrieved. The most common way to retrieve data from a database is to generate a database query. A database query is an expression that is evaluated by a database manager. One popular way to define a query uses Structured Query Language (SQL). SQL defines a syntax for generating and processing queries that is independent of the actual structure and format of the database. When the database receives a query request, it produces an access plan to execute the query in the database. A tool known as a query optimizer evaluates expressions in a query and optimizes the query and generates the access plan to access the database.

The data in the database is typically accessed through the use of queries by computer users either directly or through an applications. Query governors (QG) are employed with the computer database system to insure efficient use of the database by various users and reduce the impact of resource intensive queries on other users. The query governor compares a query's use of resources with a threshold to determine if the query should be allowed to execute. For example, the query governor compares a time estimate for a query to execute with some configured threshold, and stops queries which are estimated to take longer than the threshold. The query governor may use other thresholds such as temporary storage use or central processing unit (CPU) cycles in the same manner. Query governor thresholds are usually put in place to guard against inexperienced users writing queries which take high amounts of system resources on production machines. This inexperience leads to poorly constructed queries which may not be precisely what the user intends or may require excessive resources to get the needed data from the database. When a query is stopped by the query governor, the user may be questioned whether to proceed with the query with a prompt such as: "Did you really mean to run a query which takes N seconds?" The user can continue or kill the stopped query. Queries which are allowed to continue, and still take too long may have to be manually killed by the user or a system administrator. Thus, system administrators impose a query governor on the users to prevent large and meaningless queries from overtaking the computers and/or networks. However, more experienced users may have legitimate complex queries which will take a long time to run, but are very important to the business to run. Frustration will occur if the query governor frequently stops these legitimate queries from running.

BRIEF SUMMARY

The disclosure and claims herein are directed to a query governor that intelligently sets tailored thresholds for a query accessing a computer database. Intelligently setting the thresholds helps to balance the dynamics between experienced users and inexperienced users that compose queries to access that database. The query governor preferably generates a unique tailored threshold for each query sent to the database for execution. The tailored threshold for the query is preferably compared to an estimated query execution time to determine whether to execute the query. The query governor uses one or more factors applied to a standard threshold to generate the tailored threshold. The factors preferably include user factors, query factors and application factors. These factors are dynamically adjusted by the query governor in an intelligent way to increase optimal use of the database. Other factors may include a priority factor, a resource factor and an application factor.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 3 is a block diagram that shows a user factors data file;

FIG. 4 is a block diagram that shows a query factors data file;

DETAILED DESCRIPTION

Described herein is a database system with a query governor that intelligently sets tailored thresholds for a query accessing a computer database. Intelligently setting the thresholds balances and protects system resources between experienced users and inexperienced users that compose queries to access that database to better utilize the database. The query governor preferably generates a tailored threshold for each query sent to the database for execution. The tailored threshold for the query is preferably compared to an estimated query execution time to determine whether to execute the query. The query governor uses one or more factors applied to a standard threshold to generate the tailored threshold. The factors preferably include user factors and query factors. These factors are dynamically adjusted by the query governor in an intelligent way to increase optimal use of the database. Other factors may include factors such as priority and resource factors such as system availability and the system load due to other activity on the system which is using the system processor or other resources. Other factors may also include an application factor.

Figure 1:
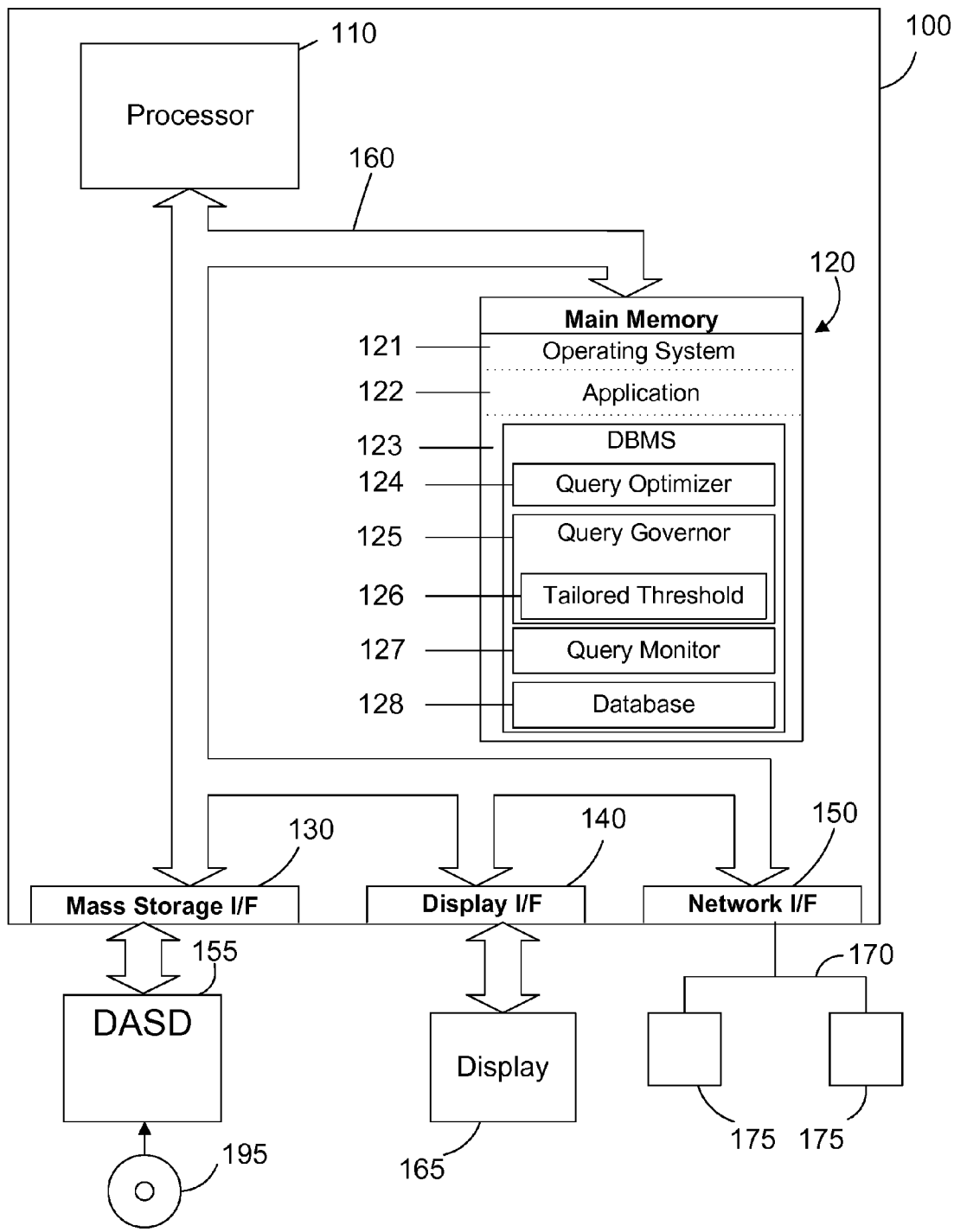
FIG. 1 is a block diagram a computer system with a query governor having a tailored threshold as described herein.

Referring to FIG. 1, a computer system 100 is one suitable implementation of a computer system that includes a query governor as described herein. Computer system 100 is an International Business Machines Corporation (IBM) Power System which can run multiple operating systems including the IBM i operating system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory further includes a software application 122 and a database management system (DBMS) 123 that includes software components used to access information stored in the database. The DBMS 123 includes a query optimizer 124 and a query governor 125 as described herein. The query governor 125 uses a tailored threshold 126 to govern a query accessing the database 128 as described further below. The database is shown residing in the DBMS 123 in memory 120 but all or portions of the database 128 may also reside on a mass storage device such as DASD 155. The memory optionally also contains a query monitor 127 that can monitor the query during execution. The database 128 includes information stored in records (not shown) that are accessed by a query as described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, application 122, database 128, query optimizer 124, query governor 125, tailored threshold 126 and the query monitor 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the DBMS 123 including the query optimizer 124, the query governor 125 and the query monitor 127.

Although computer system 100 is shown to contain only a single processor and a single system bus, those skilled in the art will appreciate that a query governor manager may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
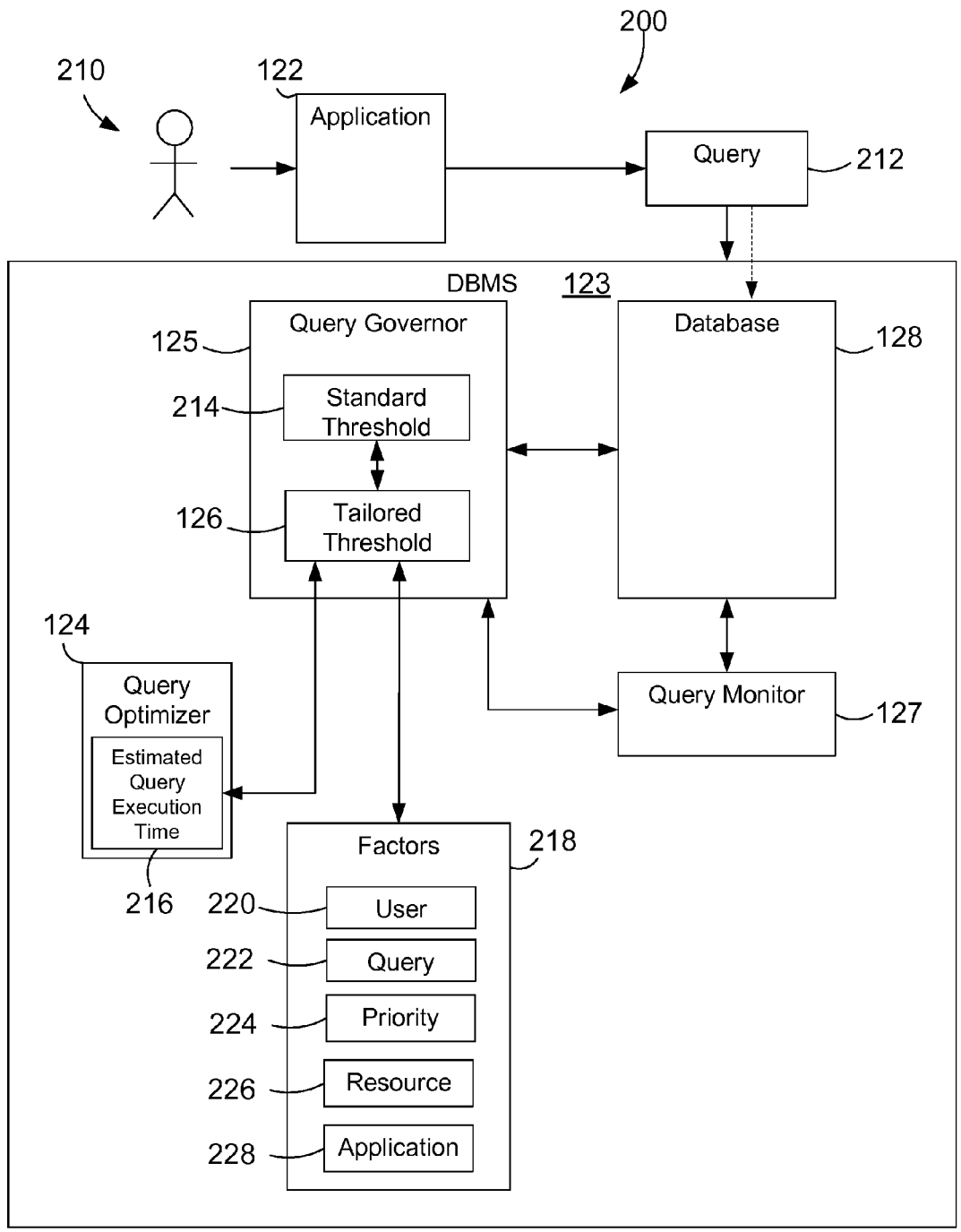
FIG. 2 is a block diagram of that illustrates a query governor governing a query accessing a database utilizing a tailored threshold as described herein.

FIG. 2 illustrates a block diagram of a computer system 200 with a query governor 125 that utilizes a tailored query threshold 126 as described and claimed herein. The computer system 200 is preferably a computer system as described in FIG. 1 that is being operated by a user 210. The user 210 utilizes an application 122 to create a query 212 that the user 210 wishes to execute on the DBMS 123 to retrieve information from the database 128. Alternatively the user 210 can write and submit a query 212 to the database 128 without using an application. The query governor 125 operates to govern the access of a query 212 to the database 128. As described herein, the query governor uses a tailored threshold 126 to govern the query 212 accessing the database 128. The query governor 125 preferably uses a standard threshold 214 in combination with one or more factors 218 to create the tailored threshold 126. The standard threshold 214 is a fixed threshold or a threshold set by a system administrator as used in the prior art and can be expressed as a period of time such as 300 seconds. The tailored threshold 126 is typically compared to an estimated query execution time 216 that is determined by the query optimizer 124 to determine whether the query is too costly to execute. The factors 218 used to create the tailored threshold include user factors 220, query factors 222 and other factors such as query or job priority 224, resource availability 226 and an application factor 228. The computer system 200 optionally includes a query monitor 127 that monitors the query 212 during execution. The query monitor may be setup to stop the query if the actual query execution time exceeds the tailored threshold.

As mentioned above, the query governor preferably determines the tailored threshold 126 based on a standard threshold 214 and one or more factors 218 as shown in FIG. 2. The query is then halted by the query governor 125 if the estimated time for execution 216 is greater than the tailored threshold. For example, the tailored threshold 126 may be calculated as follows:

$$TT = (ST*UF*QF*OF), \text{ where}$$

TT is the tailored threshold 126
ST is the standard threshold 214
UF is the user factor 220
QF is the query factor 222
OF is one of the other factors (priority 224, resource factors 226 or application factor 228)

The factors 218 are used to determine a tailored threshold that will typically be unique for each query. The factors are created and updated by the query governor based on various criteria of queries and the user to produce a tailored threshold.

Thus the factors may be determined in a variety of ways to be used as described herein. In a preferred example, the user factor 220 is expressed as a ratio of a user's score divided by 100. The user's score is preferably a number that is preferably created and maintained by the query governor for each user of the database. Preferably, a user's score is initially determined by the user type assigned to the particular user. The user type may be a group that the user belongs to. For example, a system administrator may be assigned an initial score of 120, while a new user of the database may be assigned a smaller number such as 85. The user's score 220 is preferably updated dynamically by the query governor. For example, the user's score can be updated each time a user sends a query to execute on the database. Each time a query is executed the current user's score is used to determine the tailored threshold 126, which is used to govern execution of the query. The user's score is intelligently incremented or decremented to reflect the user's allowed access for future queries to the database. For example, each time a user successfully executes a query within the tailored threshold (without the query being halted by the query governor or by a system administrator) then the user's score could be incremented. If a query must be halted by the user or a system administrator, then the query governor would decrement the user' score. Similarly, other criteria could be used to increment and decrement the user's scores which are used to calculate a tailored threshold to access to the database.

FIG. 3 illustrates a table that represents a user factors data file 300. The user factors data file 300 is a file used by the query governor (125 in FIG. 2). In the illustrated example, the user factors data file 300 includes the user name 310, the score 312 and the user type 314 for each user. The user scores 312 are used to set a tailored threshold for each query to access the database. For a simple example we will assume that the other factors are the same (QF=OF=1). In this example, if the standard threshold is 300 seconds, then a query by John D. would have a tailored threshold of: TT=300*120/100=360 seconds. Comparatively, the same query executed by Thomas A. would have a tailored threshold of: TT=300*85/100=255 seconds. These tailored thresholds would be compared to the estimated query execution time to determine whether to allow the query to execute.

Similarly, the query factor 222 can also be expressed as a ratio. Preferably the query factor is expressed as a query's score divided by 100. The query's score is also a number that is preferably created and maintained by the query governor for prior queries that have accessed the database. The initial query score could be a standard score of 100, or it could depend on the type of query. The initial query score is then incremented or decremented depending on the query. Queries that appear to be poorly constructed or otherwise appear suspicious are then given a lower query score. For example, a query that is missing a join criteria would be flagged as poorly constructed (an exception may be if one of the files has only one row). Similarly, when a query properly meets specific criteria, the query's score could be incremented.

FIG. 4 illustrates a table that represents a query factors data file 400. The query factors data file 400 is a file used by the query governor. In the illustrated example, the query factors data file 400 includes a query name or query identification (ID) 410 and the query score 412 for each query. Preferably, a query's score is determined when the query is presented for execution using the criteria described below. Further, a query's score can be saved in the query factors data file 400 by the query governor after a query is executed so that the query score can be used when the query is executed again. In addition, the query score can be updated after execution of the query. Updating the query upon completion allows the query's score to reflect the actual quality of the query in place of the suspect criteria that was used initially. For example, a query with a low score could be increased if the query executed within a time significantly less than the tailored threshold. Alternatively, the contents of the query data file 400 could be stored as part of the query access plan rather than a separate file as described here.

Some examples of criteria used to modify a query score will now be illustrated. Consider the following query (the names of the query elements are for example and are not important):

| select | a1.ARTICLE_ID, a2.CLIENT_ID |
| from | H_TICKET_LINEa1, L_CLIENT a2 |

This query is suspect because it is selecting columns from two tables but is missing join criteria which could have been specified in a WHERE clause or using INNER JOIN syntax, neither one of which is present in the query. The query represents a Cartesian product join which could return a large number of rows since every row of the first table is paired with every row in the second table. In this case, the score for the query would be decremented (for example by 25). Those skilled in the art will recognize that this applies generally to any SQL statement which includes some form of join operation.

Another example of a suspect query is as follows:

Select * from History_June x, History_July y
where day(x.Date_ID) = day(y.Date_ID)
order by x.Item_On_Clearance In this example, neither side of join in the "where" clause (shown in Bold) is unique, thus it probably is not the results the user wants so decrement the query score (for example by 35). Further, the "order by" clause has a boolean field that is suspicious since the query is estimated to return millions of rows, so decrement the query score (for example by 15).

An example of incrementing a query scores is as follows:

select a3.FAMILY_ID, a1.ARTICLE_ID,
SUM (a1.Tax_Amount)
from H_TICKET_LINE a1,
    L_CLIENT a2,
    L_ARTICLE a3
where a2.CLIENT_ID = a1.CLIENT_ID
    and a3.ARTICLE_ID = a1.ARTICLE_ID
    and a1.DATE_ID Between '03/10/1999' AND '04/22/1999'
group by
    a3.FAMILY_ID,
    a1.ARTICLE_ID;

The bolded excerpt of the join criteria of the query is found to be a known excerpt or portion of the query so increment the query score (for example by 15). Or alternatively as another example, if the whole query is known, increment the query score by 50.

The following is a non-exhaustive list of additional criteria that can be used to determine whether or not a query is "suspicious" to lower or raise the query score in a similar manner as described in the previous paragraphs.

Cartesian product joins

Queries without a WHERE clause

Joins with no indexes over join columns.

Queries which result in many rows being inspected to build the results but relatively few result rows are actually fetched. This can occur when a user submits a large query only to review a small number of rows, for example retrieving all of a customer's order history only to review the last few orders.

Environmental factors which provide an indication of validity of a large SQL request. For some database products this can be inferred from environmental settings such as having an optimization goal of *FIRSTIO which favors returning the first screen of data quickly or *ALLIO which favors processing all the rows quickly. In this example, a large query would be suspicious for *FIRSTIO which is typically an end user. It would not be as suspicious for *ALLIO which is more typically used for large reports.

Long running queries over historical data. Historical data could be specifically identified to the query governor or this could be inferred from the nature of the query. For example, some applications will do join operations against the current and history files. This can be inferred when a larger table and smaller table are joined and the two tables have the same column definitions. The larger is normally history. This can also be inferred over time as a history table is updated infrequently and only with a substantial number of rows when current information is transferred to history.

Whole file aggregation (i.e. no grouping criteria).

ordering over low cardinality fields (example Boolean fields)

GROUPing columns from multiple tables

Source of the query or the interface the query comes from. For example, if all user queries come thru a particular application, they could be given a certain threshold, whereas developer queries may come thru a second application and given a second threshold.

Queries which have indexes advised over large tables.

Queries containing the DISTINCT clause which process many rows to return only a few results. This can occur when a user queries a large table for some trivial information such as querying the entire inventory table for distinct location values.

As mentioned above, priority factors 224, resource factors 226 and application factors 228 can also be used to determine the tailored threshold. The priority factor 224 is a factor based on the priority of the job that originated the query. The run priority of the job can be used as an indicator where end users are typically given a higher priority which would make a large query with a high run priority more suspicious. In this case the priority factor can be adjusted to lower the tailored threshold. Resource factors 226 could include the load or availability of the system. For example, when the load of the system is high, a resource load factor could be used to lower the tailored threshold. Similarly, when the load of the system is low, a resource load factor could be used to increase the tailored threshold. Similarly, a resource availability factor could be adjusted based on the availability of a resource.

As described with reference to FIG. 2, the query governor may also use an application factor to generate a unique tailored threshold for each query to the database. To generate the application factor, the query governor could call a previously registered exit program which could also adjust the application factor 228. For example, an application could provide an exit program that would look at the configuration of the application user which may not correspond directly to the operating system user. The application could make a better decision of a user's score as it understands application context. In another example, the query governor may call an exit program (not shown) to gather information for the factors used in calculating the tailored threshold. As used herein, using an exit program means that the system provides a way for a user or an application to call a specific program when certain events occur. The interfaces for the exit program are precisely defined with regard to what input parameters are sent and what outputs are expected. Alternatively, the application factor could be computed by the query governor by looking at the call stack. For example if a well known application is generating the query, the query governor may give an application factor of 150/100, but if it is an interface that allows the user to write their own SQL (and thus more prone to include poorly written queries) then it may give a weight of 75/100 for the application factor.

Figure 5:
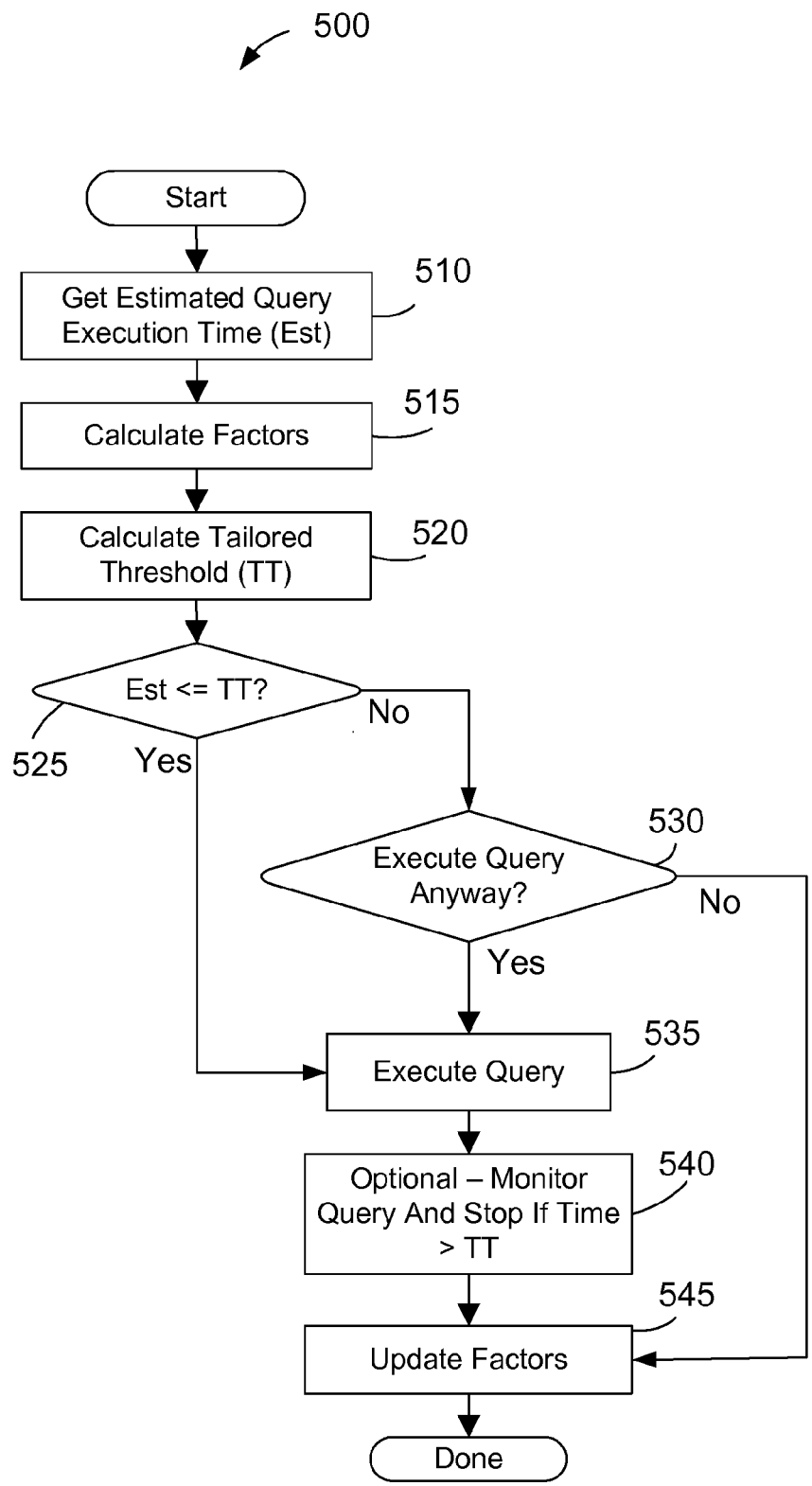
FIG. 5 is a method flow diagram for governing access to a database with a tailored threshold as claimed herein.

FIG. 5 shows a method 500 for governing a query based on a tailored threshold as claimed herein. The steps in method 500 are preferably performed by the query governor 125 (FIG. 1), but portions of the method may also be performed by other software associated with the computer system. First, get the estimated query execution time from the query optimizer (step 510). Next, calculate the factors used to determine the tailored threshold (step 515). Then calculate the tailored threshold using a standard threshold and the factors (step 520). Step 520 may include calling an exit program to get additional information to support the calculations as described above. If the estimated query execution time is not less than the tailored threshold (step 525=no), then determine whether to execute the query anyway (step 530). If it is determined to execute the query anyway (step 530=yes) then execute the query (step 535). If it is determined to not execute the query anyway (step 530=no) then go to step 545. If the estimated query execution time is less than or equal to the tailored threshold (step 525=yes), then also execute the query (step 535). Optionally, then monitor the query execution and stop execution if the time to execute the query exceeds the tailored threshold or some multiple of the tailored threshold (step 540). Then update the factors if necessary to reflect the outcome of the query on the user score and query score (step 545). The method is then done.

Again referring to FIG. 5, in step 530 the determination is made whether to execute the query anyway when the estimated query execution time is greater than the tailored threshold. This step may be performed in a variety of ways. In a preferred example, the query is executed despite the estimated query time being greater than the tailored threshold based on an environment variable. In this example, when an environment variable is set, the user is prompted whether or not to continue to execute the query and the query is executed if the user selects to continue the query. Conversely, if the environment variable is not set, the user is not given the option to continue the query. The environment variable can be set up by a system administrator and stored in the computer system and made available to the query governor.

In another preferred example for step 530, the query is executed despite the estimated query time being greater than the tailored threshold based on a determination made by an exit program. In this example, if an exit program has been configured, it is called. The interfaces for the exit program precisely define what input parameters are sent and what outputs are expected. In this example, the query governor gives information about the query and the estimates to the exit program. The exit program returns a value indicating whether or not the query processing should proceed. Then the query governor continues by executing the query or not based on the value from the exit program.

Figure 6:
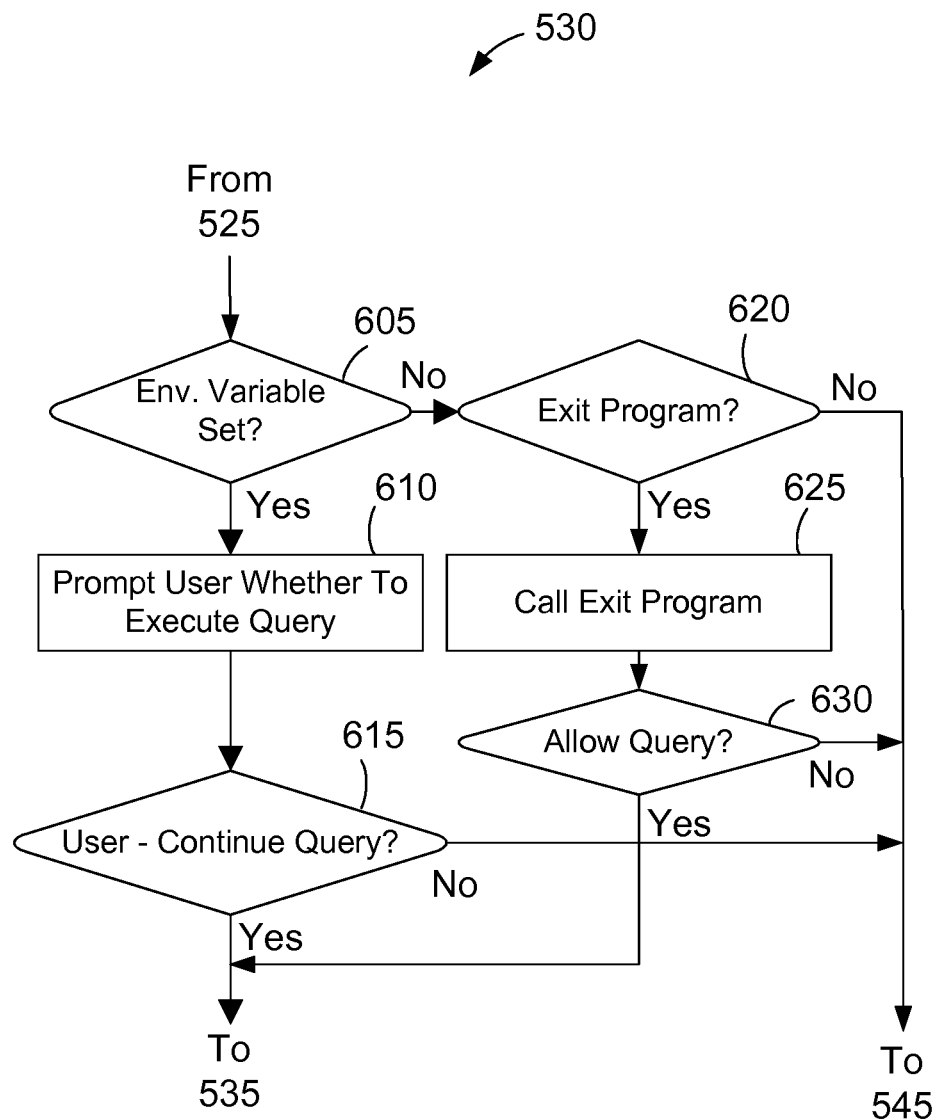
FIG. 6 is an example of a method flow diagram for determining whether to execute a query according to step 530 in FIG. 5.

FIG. 6 shows a method 530 for determining whether to execute a query when the estimated query execution time is greater than the tailored threshold. Method 530 is an example of performing the step 530 in FIG. 5 according to the examples described in the previous two paragraphs. The steps in method 530 are preferably performed by the query governor 125 (FIG. 1), but portions of the method may are also preferably performed by other software associated with the computer system referred to as an exit program. Method 530 first determines whether there is an environment variable set up to prompt the user whether to continue (step 605). If the environment variable is set (step 605=yes) then prompt the user whether to execute the query (step 610). If the user selects to continue the query (step 615=yes) then execute the query by going to step 535 in FIG. 5. If the user selects not to continue the query (step 615=no) do not execute the query and continue by going to step 545 in FIG. 5. If the environment variable is not set (step 605=no) then determine if there is an exit program set up to determine whether to execute the query (step 620). If an exit program is set up (step 620=yes) then call the exit program (step 625). If the query should be allowed based on parameters from the exit program (step 630=yes), then continue by going to step 535 in FIG. 5. If the query should not be allowed based on parameters from the exit program (step 630=no), then continue by going to step 545 in FIG. 5. Method 530 thus continues to completion as shown in FIG. 5. The order of the steps 605 and 620 may be reversed and other criteria could also be used to determine whether to proceed with execution of the query. Alternatively, step 605 or 620 may be eliminated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, a query governor intelligently sets tailored thresholds for a query accessing a computer database to balance and protects system resources between experienced users and inexperienced users that compose queries to access that database. The query governor preferably determines a tailored threshold for each query sent to the database for execution and compares the tailored threshold to an estimated query execution time to determine whether to execute the query.

One skilled in the art will appreciate that many variations are possible within the scope of the claims. For example, in addition to processing time (CPU time), the tailored threshold may also be expressed as elapsed time, temporary storage, memory storage, processing cycles (CPU cycles), etc. While the examples herein are described in terms of time, these other types of thresholds are expressly intended to be included within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
a computer system comprising at least one processor and a memory coupled to the at least one processor;
a query created by a user of the computer system;
a query governor in the memory and when executed by the processor limits the query accessing the database based on a tailored threshold that is unique to the query, where the tailored threshold is dynamically generated by the query governor by applying at least one factor to a fixed threshold.

2. The apparatus of claim 1 wherein the at least one factor used to generate the tailored threshold comprises one or more factors chosen from: a user factor, a query factor, a job priority factor, a resource load factor, or an application factor.

3. The apparatus of claim 2, wherein the query governor intelligently creates and maintains a user score for each user accessing the database that is used to calculate the user factor to determine the tailored threshold.

4. The apparatus of claim 3 wherein the user score is initially determined by the type of user.

5. The apparatus of claim 4 wherein the user score is increased when the user creates a new query that has an estimated time that does not exceed the tailored threshold and decreased when the estimated time exceeds the tailored threshold and decreased when an administrator halts the query.

6. The apparatus of claim 3 wherein the query factor is created by the query governor based on a query score, where a query that appears poorly constructed is given a lower query score.

7. The apparatus of claim 6 wherein the query appears poorly constructed when the query has one of the following criteria: missing join criteria, neither side of a join is unique, Cartesian product joins, queries without a WHERE clause, joins with no indexes over join columns, grouping columns from multiple tables, and the source of the query (i.e. what application submitted the query).

8. The apparatus of claim 6 wherein the query score is increased where at least a portion of the query is known.

9. The apparatus of claim 1 wherein the tailored threshold is determined in terms of one of the following: elapsed time, temporary storage, processing time, processing cycles and memory storage.

10. A computer-implemented method for governing access of a query to a database on a computer system, the method comprising the steps of:
(A) receiving an estimated query execution time for the query;
(B) calculating a factor for the query, wherein the factor is one or more factors chosen from: a user factor, a query factor, a job priority factor, or a resource factor;
(C) dynamically generating a tailored threshold that is unique to the query, where the tailored threshold is determined by applying the factor to a fixed threshold;
(D) governing the query's access to the database based on the tailored threshold; and
(E) wherein the method steps are implemented in a computer software program stored in computer memory and executed by a computer processor.

11. The method of claim 10 further comprising the step of: intelligently creating a user score for each user accessing the database that is used to calculate the user factor to determine the tailored threshold.

12. The method of claim 10 wherein the user score is initially determined by the type of user.

13. The method of claim 11 wherein the user score is increased when the user creates a new query that has an estimated time that does not exceed the tailored threshold and decreased when the estimated time exceeds the tailored threshold.

14. The method of claim 10 wherein the query factor is created by the query governor based on a query score, where a query that appears poorly constructed is given a lower query score.

15. The method of claim 14 wherein the query score is increased where at least a portion of the query is known.

16. A computer-implemented method for governing access of a query to a database on a computer system, the method comprising the steps of:
(A) receiving an estimated query execution time for the query;
(B) calculating at least one factor for the query, wherein the at least one factor is one or more factors chosen from: a user factor, a query factor, a job priority factor, application factor, or a resource factor;
(C) dynamically generating a tailored threshold that is unique to the query, where the tailored threshold is determined by applying the at least one factor to a fixed threshold;
(D) governing the query's access to the database based on the tailored threshold; and
(E) intelligently creating a user score for each user accessing the database that is used to calculate the user factor to determine the tailored threshold, wherein the user score is initially determined by the type of user; and wherein the user score is increased when the user creates a new query that has an estimated time that does not exceed the tailored threshold and decreased when the estimated time exceeds the tailored threshold;
(F) wherein the query factor is created by the query governor based on a query score, where a query that appears poorly constructed is given a lower query score; wherein the query score is increased where at least a portion of the query is known; and
(G) wherein the method steps are implemented in a computer software program stored in computer memory and executed by a computer processor.

17. An article of manufacture comprising: a query governor for governing access of a query to a database, where the query governor is stored on a computer recordable media that when executed by a computer processor performs the steps of:
(A) receiving an estimated query execution time for the query;
(B) calculating a factor for the query, wherein the factor is one or more factors chosen from: a user factor, a query factor, a job priority factor, application factor, or a resource factor;
(C) dynamically generating a tailored threshold that is unique to the query, where the tailored threshold is determined by applying the factor to a fixed threshold; and
(D) governing the query's access to the database based on the tailored threshold.

18. The article of manufacture of claim 17 further comprising the step of: intelligently creating a user score for each user accessing the database that is used to calculate the user factor to determine the tailored threshold.

19. The article of manufacture of claim 17 wherein the user factor is initially determined by the type of user.

20. The article of manufacture of claim 17 wherein the user score is increased when the user creates a new query that has an estimated time that does not exceed the tailored threshold and decreased when the estimated time exceeds the tailored threshold.

21. The article of manufacture of claim 17 wherein the query factor is created by the query governor based on a query score, where a query that appears poorly constructed is given a lower query score.

* * * * *